(12) United States Patent
Everton et al.

(10) Patent No.: US 12,296,417 B2
(45) Date of Patent: May 13, 2025

(54) MULTI-COMPONENT COIN ASSEMBLY SYSTEM AND METHOD

(71) Applicant: Monnaie Royale Canadienne/Royal Canadian Mint, Ottawa (CA)

(72) Inventors: Bradley Everton, Winnipeg (CA); Xianyao Li, Ottawa (CA); Kewei Qian, Winnipeg (CA); Trevor Scott Sawatzky, Winnipeg (CA); Patrick Roland Lessard, Winnipeg (CA)

(73) Assignee: Monnaie Royale Canadienne/Royal Canadian Mint, Ottawa (CA)

( * ) Notice: Subject to any disclaimer, the term of this patent is extended or adjusted under 35 U.S.C. 154(b) by 0 days.

(21) Appl. No.: 17/787,491

(22) PCT Filed: Dec. 18, 2020

(86) PCT No.: PCT/CA2020/051761
§ 371 (c)(1),
(2) Date: Jun. 20, 2022

(87) PCT Pub. No.: WO2021/119839
PCT Pub. Date: Jun. 24, 2021

(65) Prior Publication Data
US 2023/0166369 A1 Jun. 1, 2023

Related U.S. Application Data

(60) Provisional application No. 62/950,620, filed on Dec. 19, 2019.

(51) Int. Cl.
*B23P 19/10* (2006.01)
*B23P 19/00* (2006.01)
(Continued)

(52) U.S. Cl.
CPC ............ *B23P 19/02* (2013.01); *B23P 19/002* (2013.01); *B23P 19/004* (2013.01);
(Continued)

(58) Field of Classification Search
CPC .. Y10T 29/49938; F16B 4/004; B23P 19/002; B23P 19/004; B23P 19/006; B23P 19/02; B23P 19/10
See application file for complete search history.

(56) References Cited

U.S. PATENT DOCUMENTS 4,472,891 A * 9/1984 Ielpo ...................... A44C 21/00
29/520
5,630,288 A * 5/1997 Lasset ..................... B44B 5/008
428/609
(Continued)

FOREIGN PATENT DOCUMENTS

DE 1777351 A1 11/1972
DE 19841622 3/2000
(Continued)

OTHER PUBLICATIONS

International Search Report for PCT Application No. PCT/CA2020/051761, mailed Mar. 17, 2021.
(Continued)

*Primary Examiner* — Jermie E Cozart
(74) *Attorney, Agent, or Firm* — Andrus Intellectual Property Law, LLP

(57) ABSTRACT

Methods and systems are provided for assembly of coin components. Two or more coin components are received in an assembly station having at least two assembling members. The assembling members may be configured to form a chamber comprising the cavities and at least one assembling member may be movable over an assembling path. A merging force may be applied for assembling the coin
(Continued)

components together to allow continuous production of joined coin components such that when the movable assembling member travels along the assembling path, one coin component locates within the other, thereby forming a coin assembly over a non-zero distance.

6 Claims, 16 Drawing Sheets

(51) Int. Cl.
*B23P 19/02* (2006.01)
*F16B 4/00* (2006.01)

(52) U.S. Cl.
CPC ............. *B23P 19/006* (2013.01); *B23P 19/10* (2013.01); *F16B 4/004* (2013.01); *Y10T 29/49938* (2015.01)

(56) References Cited

U.S. PATENT DOCUMENTS

| | | | | |
|---|---|---|---|---|
| 6,044,541 | A * | 4/2000 | Truong | A44C 21/00 428/609 |
| 6,189,197 | B1 * | 2/2001 | Kim | A44C 21/00 428/609 |
| 8,533,929 | B2 * | 9/2013 | Kim | B21D 53/44 29/522.1 |
| 2009/0064751 | A1 | 3/2009 | Gregory | |
| 2016/0129725 | A1 | 5/2016 | Kneer et al. | |
| 2017/0216903 | A1 | 8/2017 | Tian et al. | |
| 2019/0054581 | A1 | 2/2019 | Prinzinger | |
| 2019/0118574 | A1 | 4/2019 | Rimpl | |

FOREIGN PATENT DOCUMENTS

| | | |
|---|---|---|
| DE | 10057000 | 5/2001 |
| DE | 102013106375 | 12/2014 |
| DE | 102015115647 | 3/2017 |
| DE | 102015119174 | 5/2017 |
| EP | 0320731 A2 | 6/1989 |
| GB | 2493059 A | 1/2013 |
| JP | 3889461 B2 | 3/2007 |
| WO | 2017157667 | 9/2017 |
| WO | 2017220320 | 12/2017 |

OTHER PUBLICATIONS

European Patent Application No. 20902532.9, Office Action dated Feb. 18, 2025.

* cited by examiner

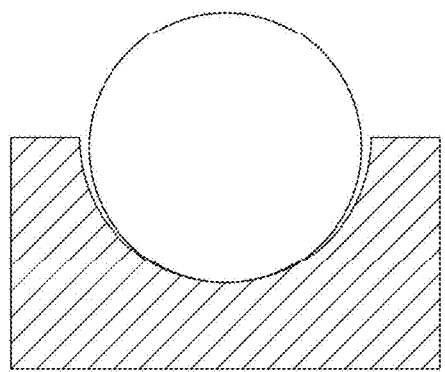
FIG. 3
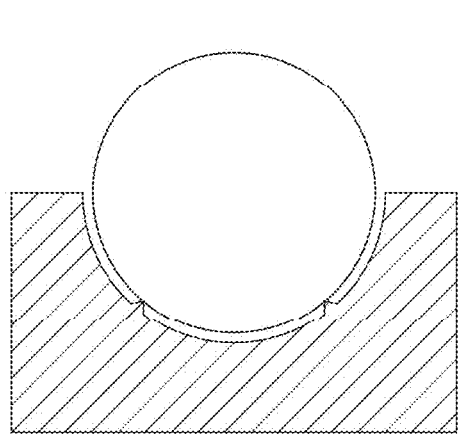 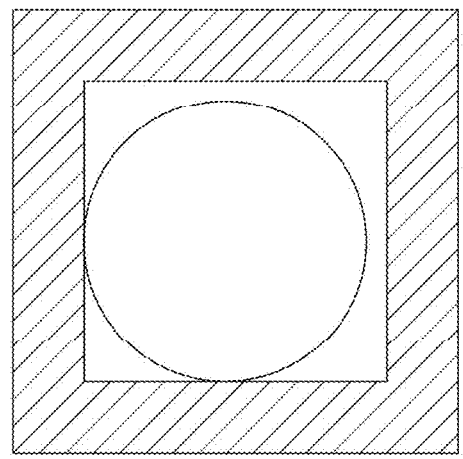
FIG. 4A　　　　FIG. 4B

Station I (18): Subassembly (1+2)

Station II (19): Subassembly (1+2+3)

Station III (20): Subassembly (1+2+3+4)

MULTI-COMPONENT COIN ASSEMBLY SYSTEM AND METHOD

CROSS-REFERENCE TO RELATED APPLICATIONS

This application is the U.S. national stage application of International Application PCT/CA2020/051761, filed Dec. 18, 2020, which international application was published on Jun. 24, 2021, as International Publication WO 2021/119839 in the English language. The International Application claims the benefit of priority to U.S. Patent Application Ser. No. 62/950,620, filed on Dec. 19, 2019, the contents of which are hereby incorporated by reference in entirety.

FIELD

The present disclosure relates to coin or coin blank assembly systems and methods, and more particularly to assembly of multi-component coins, tokens, chips and the like.

BACKGROUND

Coins and coin blanks are commonly formed from a single piece of metal. Multi-metallic coins and coin blanks may be used, however, to increase the complexity and thereby increase the security features of coins. Similarly, the number of different components or subcomponents used in the final coin or coin blank is, all else being equal, directly proportional to the security of the final coin or coin blank.

Coins and coin blanks comprising multiple components or subcomponents are commonly assembled using coining press feed systems and may include a feed bowl, feed track, buffer track, coining dies and coining press dial plates.

DE 198 41 622 describes an assembly to join multi-metal coin blanks having two feed channels. This application teaches a device for merging a plurality of coin subcomponents into a ring-shaped component. It further teaches feeding stacked subcomponents into the device by stacking the coin components face-to-face, while stacking the ring-shaped subcomponent in an edgewise fashion.

The prior art describes instances relating to transport devices for transporting coin blanks to a stamping station. For instance, WO2017/157667, WO2017/220320, DE 10 2015 115 647 and DE 10 2015 119 174 describe two revolving (dial) plates in their assemblies.

In particular, DE 10 2015 115 647 describes a transport device and a method for manufacturing a coin by using the transport device. The transport device can transport circular blanks to a stamping station. A drivable first transport part with multiple first transport pockets is provided for this purpose. A first play exists between the outer contour of the circular blank and the inner contour of the first transport pocket. The transport device also features a second transport part with multiple second transport pockets. A second play exists between the outer contour of the circular blank and the inner contour of the second transport pocket. The second play is greater than the first play. At a transfer point, the circular blanks are transferred from a first transport pocket to a second transport pocket. The circular blanks are transported inside the second transport pocket to the stamping station, where a coin is minted from the circular blank. The minted coin is then transported onwards from the stamping station inside the first transport pocket of the first transport part and extracted from the first transport part at an extraction point.

DE 10057000 describes a multi-metal coin producing device, with outer and inner blank feed devices and a "pressing stage". It teaches a plurality of feeders that transfer coin blank components in the insertion stage. The transfer occurs by having at least two parallel feed bars that each travel along a transport path. The parallel feed bars each have a plurality of fingers holding the annular outer blanks. It further discloses turntables that, inter alia, each have "holding elements" where a coin blank component is held and transported in a "circumferential path".

US 2009/0064751 describes a rotary pressing table into which blanks are fed. It further teaches a store receptacle for the blanks and a feed system for feeding the blanks stored in the receptacle to the rotary pressing table. It further teaches that the feed system includes a guide conduit into which the blanks pass after they are dispensed and are urged to file one behind the other to an exit from the guide conduit. The blanks in US 2009/0064751 pass directly from the conduit into a receiving station of the rotary pressing table.

DE 10 2013 106375 describes inserting a "core" having a non-circular outer contour into a complementary inner contour of another blank. The core and complementary blank can be positioned and aligned by a depressing means and joined by a push-in force acted upon the depressing means. It additionally discloses a method for inserting a blank core having a non-circular outer contour into a complementary blank having a matched inner contour. The method involves transporting a blank ring, positioning the blank, applying a push-in force with a crimping means.

The above information is presented as background information only to assist with an understanding of the present disclosure. No assertion or admission is made as to whether any of the above might be applicable as prior art with regard to the present disclosure.

SUMMARY

The present disclosure is directed to a system for assembling coin components where the system is made up of one or more assembly stations. Each assembly station has a first assembling member that defines a first cavity for receiving a "receiving" coin component. The assembly station may also have a second assembling member that defines a second cavity for receiving an insertable coin component. The insertable coin component may be insertable into the receiving coin component.

The first and second assembling members may be configured for aligning a plurality of coin components, at least the receiving and insertable coin components, such that the centres of the coin components are aligned along a central axis of the receiving coin component. Additionally, at least one of the first and second assembling members may be movable over an assembling path by a moving force, such that when the movable assembling member travels along the assembling path, the insertable coin component locates within the receiving coin component, thereby forming a coin assembly as it travels along the assembling path.

The first and second cavities may be aligned for merging two or more components over the assembling path with the application of a merging force, where at least one of the coin components is a receiving coin component. Subassemblies of multicomponent coins or coin blanks may be fed into subsequent assembly systems or stations to be assembled with additional components or subcomponents. The final multi-component coin blank assembly may be fed into a guide channel of a coining press for joining and coining with loose or tight fits.

The assembling system itself may include one or more guide channels for individually feeding one or more coin components into corresponding receiving cavities. Coin components may be pre-assembled into subassemblies by previous assembly stations for merging with additional components or subassemblies at the time of feeding. The receiving cavities may have at least one contact datum point.

The assembly system and method may allow assembly of geometrically complex and unique coin blank components at high speed and may be performed in an automatic mode.

The assembly system may also allow for dual sided loading of mating components. Merging forces may be applied to one or more opposing faces of the loaded components to assemble them together.

In an embodiment, the first and second assembly members are movable relative to one another for forming the chamber and for narrowing the chamber for assembling the first and second coin components together.

In an embodiment, the first assembling member is movable along a first path and second assembling member is movable along a second path.

According to an aspect, the present disclosure is directed to a system for assembling coin components made up of one or more assembly stations. Each assembly station has an assembling member defining a cavity which is configured to receive a plurality of coin components. At least one of the plurality of coin components is a receiving component. The assembling member is configured to align the plurality of coin components along a central axis of the receiving component. In this aspect, the assembling member is movable over an assembling path by application of a moving force, such that when the assembling member travels along the assembling path, the coin components locate within the receiving component thereby forming a coin assembly.

In an embodiment, a merging force may be applied in a direction between 0° and 89.99° relative to a central axis of the receiving component.

In an embodiment, the merging force is a contact force.

In an embodiment, the system comprises an actuator for applying the merging force.

In an embodiment, the actuator is a pneumatic actuator.

In an embodiment, the actuator is an electronic actuator.

In an embodiment, the actuator is a mechanical actuator.

In an embodiment, the merging force is a non-contact force.

In an embodiment, the actuator is a magnetic actuator.

In an embodiment, at least one of the coin components experiences axial tilt along the assembling path of between 0° and 45° relative to the central axis.

In an embodiment, the system comprises a cam for applying the merging force generally coaxially about the central axis.

In an embodiment, the system comprises two opposing cams for applying two opposing merging forces generally coaxially about the central axis.

In an embodiment, the first and second coin components are loaded into the cavity by at least one coin array, each coin array comprising a guide channel configured to feed the coin components into the cavity in an edgewise fashion.

In an embodiment, the first and second cavities each comprise at least one contact datum point arranged to align the first and second coin components about the central axis.

In an embodiment, the assembling path is linear.

In an embodiment, the assembling path is non-linear.

In an embodiment, the assembling path is circular.

In an embodiment, the assembling path terminates in a drop out slot for discharging the assembled first and second coin components from the assembly station.

According to an aspect, the present disclosure is directed to a method of assembling coin components, the method comprising:
  a) providing the coin components in an assembly station; and
  b) assembling the coin components over a non-zero distance along an assembling path.

In an embodiment, the assembling path is non-colinear with a central axis of at least one of the coin components.

In an embodiment, the coin components are assembled over the non-zero distance by at least one merging force, the at least one merging force being exerted 0° to 89.99° relative to the central axis.

In an embodiment, the at least one merging force is a camming force.

In an embodiment, at least one of the coin components experiences axial tilt along the non-zero distance.

In an embodiment, the coin components are provided in parallel planes and aligned along the central axis.

In an embodiment, the coin components are assembled together over the non-zero by two opposing forces.

In an embodiment, the two opposing forces are exerted generally coaxially with the central axis about the coin components.

In an embodiment, the two opposing forces are camming forces.

In an embodiment, the coin components may be loaded from one or both sides of the central axis.

In an embodiment, the non-zero distance is linear.

In an embodiment, the non-zero distance is non-linear.

In an embodiment, the non-zero distance is circular.

In an embodiment, the coin components are assembled in a press fit.

In an embodiment, the coin components are assembled in a loose fit.

In an embodiment, the coin components are assembled in a force lock fit.

In an embodiment, the assembled coin components are discharged at a terminus of the assembling path.

In an embodiment, the assembled coin components are fed into a second assembling station for assembly with at least one additional coin component.

In an embodiment, the assembled coin components are fed through a series of sequentially arranged assembling stations for assembly with at least one additional coin component at each subsequent assembly station.

According to an aspect, the present disclosure is directed to a method for assembling coin components, the method comprising:
  a) providing an assembly station, the assembly station comprising:
  a first assembling member defining a first cavity for receiving a receiving coin component, and
  a second assembling member defining a second cavity for receiving an insertable coin component;
  the first and second assembling members configured to form a chamber together, the chamber comprising the first and second cavities configured to align the receiving coin component and the insertable coin component along a central axis of the receiving coin component;
  at least one of the first and second assembling members being a movable assembling member that is movable over an assembling path by application of a moving force, such that when the movable assembling member travels along the assembling path, the insertable coin component locates within the receiving coin component, thereby forming a coin assembly;

b) providing a first coin component in the first cavity;

c) providing a second coin component in the second cavity; and d) assembling the first coin component and the second coin component together by moving at least one of the first and second assembling member over an assembling path.

In an embodiment, the first assembling member is movable along a first assembling path and the second assembling member is movable along a second assembling path.

In an embodiment, the assembling path is non-colinear with the central axis.

In an embodiment, the coin components are assembled over the assembling path by at least one merging force, the at least one merging force being applied from 0° to 89.99° relative to the central axis.

In an embodiment, the merging force is a contact force.

In an embodiment, the method comprises applying the at least one merging force by an actuator.

In an embodiment, the actuator is a pneumatic actuator.

In an embodiment, the actuator is an electronic actuator.

In an embodiment, the actuator is a mechanical actuator.

In an embodiment, the at least one merging force is a non-contact force.

In an embodiment, the actuator is a magnetic actuator.

In an embodiment, at least one of the coin components experiences axial tilt along the assembling path.

In an embodiment, at least one of the coin components experiences axial tilt along the assembling path of between 0° and 45° relative to the central axis.

In an embodiment, the first and second assembling members are movable relative to one another for forming the chamber and for narrowing the chamber for locating the insertable coin component within the receiving coin component.

In an embodiment, the first and second assembling members are movable in tandem over the first assembling path and the second assembling path, respectively, by application of a first moving force and a second moving force.

In an embodiment, the method comprises at least one cam for applying the merging force generally coaxially about the central axis.

In an embodiment, the method comprises two opposing cams for applying two opposing merging forces generally coaxially about the central axis.

In an embodiment, the receiving coin component and the insertable coin component are loaded into the first and second cavities by a first coin array and a second coin array, respectively, each coin array comprising a guide channel configured to feed the receiving coin component and insertable coin component into the first and second cavities in an edgewise fashion.

In an embodiment, the first and second cavities each comprise at least one contact datum point arranged to align the first and second coin components about the central axis.

In an embodiment, the assembling path is linear.

In an embodiment, the assembling path is non-linear.

In an embodiment, the assembling path is circular.

In an embodiment, the assembling path terminates in a drop out slot for discharging the coin assembly from the assembly station.

According to an aspect, the present disclosure is directed to a method for assembling coin components, the system comprising:

a) providing an assembly station, the assembly station comprising:

an assembling member defining a cavity, the cavity configured to receive a plurality of coin components, where at least one coin component is a receiving component, and align the plurality of coin components along a central axis of the receiving component the assembling member being movable over an assembling path by application of a moving force, such that when the assembling member travels along the assembling path, the coin components locate within the receiving component thereby forming a coin assembly;

b) providing a plurality of coin components in the cavity;

c) assembling the plurality of coin components together by moving the assembling member over an assembling path.

In an embodiment, the plurality of coin components are assembled over the assembling path by at least one merging force, the at least one merging force being exerted from 0° to 89.99° relative to the central axis.

In an embodiment, the merging force is a contact force.

In an embodiment, the method comprises applying the at least one merging force by an actuator.

In an embodiment, the actuator is a pneumatic actuator.

In an embodiment, the actuator is an electronic actuator.

In an embodiment, the actuator is a mechanical actuator.

In an embodiment, the merging force is a non-contact force.

In an embodiment, the actuator is a magnetic actuator.

In an embodiment, at least one of the coin components experiences axial tilt along the assembling path.

In an embodiment, at least one of the coin components experiences axial tilt along the assembling path of between 0° and 45° relative to the central axis.

In an embodiment, the method comprises a cam for applying the merging force generally coaxially about the central axis.

In an embodiment, the method comprises two opposing cams for applying two opposing merging forces generally coaxially about the central axis.

In an embodiment, the coin components are loaded into the cavity by at least one coin array, each coin array comprising a guide channel configured to feed the coin components into the cavity in an edgewise fashion.

In an embodiment, the cavity comprises at least one contact datum point arranged to align the coin components about the central axis.

In an embodiment, the assembling path is linear.

In an embodiment, the assembling path is non-linear.

In an embodiment, wherein the assembling path is circular.

In an embodiment, the assembling path terminates in a drop out slot for discharging the coin assembly from the assembly station.

The foregoing summary provides some aspects and features according to the present disclosure but is not intended to be limiting. Other aspects and features of the present disclosure will become apparent to those ordinarily skilled in the art upon review of the following description of specific embodiments in conjunction with the accompanying figures. Accordingly, the drawings and detailed description are to be regarded as illustrative in nature and not restrictive.

BRIEF DESCRIPTION OF THE DRAWINGS

Embodiments of the present disclosure will now be described, by way of example only, with reference to the attached Figures.

FIG. 3 is a schematic front view of single-contact positioning.

FIG. 4A-B is a schematic front view of multi-contact positioning.

FIG. 6A-D is a plan view of a dynamic assembly with cam-based merging forces and axial tilt over an assembling path.

DETAILED DESCRIPTION

Figure 1:
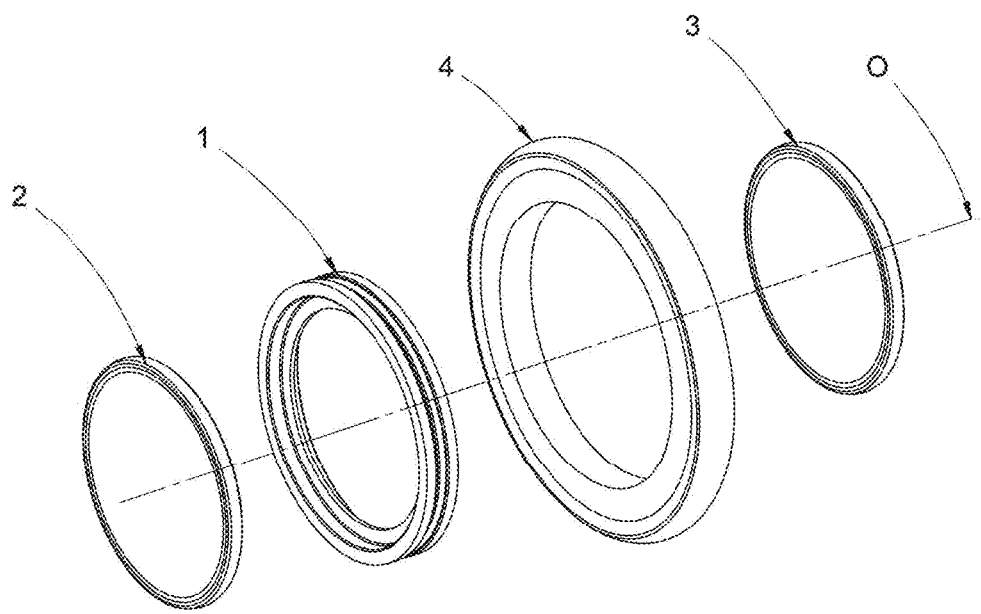
FIG. 1 is an exploded perspective view of a quad component composite coin blank.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

This disclosure generally relates to coin or coin blank assembly systems and methods, and more particularly to assembly of multi-component coins, tokens, chips and the like. For the purposes of this description, the terms blank, component, and subcomponent may be used interchangeably. Additionally, the terms "merging" and "assembling" may also be used interchangeably.

The coin assembly systems and methods of the present disclosure may permit the assembly or coining of a plurality of coin components over a distance. One or more assembly stations may be configured to assemble coin components simultaneously or in a stepwise fashion.

Figure 2:
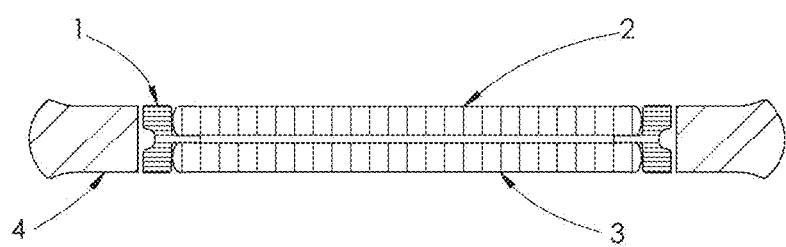
FIG. 2 is a perspective view of a quad component coin blank.

For example, FIG. 1 and FIG. 2 show an exploded view of a quad-component composite coin blank and perspective view of the quad-component composite coin, respectively. In this example, the coin blank or coin may comprise an inner stack comprising two inserts 2,3 facing each other, an outer ring 4 annularly surrounding the inner stack; and a separator 1 disposed between the outer ring 4 and the inner stack, separating the outer ring from the inner stack and separating the inserts 2,3 from each other. As can be seen from this example, the coin blank or coin may have components of varying thicknesses and geometry. Additionally, the separator 1 may have a partial or full inner web separating stacked inserts from each other.

At least one of the components of the quad-component composite coin may be a receiving component. In FIG. 1 for example, the outer ring 4 may be a receiving component, the central axis of which is indicated by line O. In this example, the separator 1 and inserts 2,3 may be insertable coin components.

Guide Channel and Array

A coin blank array may be an edgewise stack of coin blanks, components, or subcomponents. Each array may be housed within a guide channel to align coin blanks, components, or subcomponents for loading into a respective receiving cavity.

Optionally, retainer plates 36,37,38 may be disposed between the guide channels 5,6, 26, 27 to prevent the coin blanks, components, or subcomponents from prematurely assembling into a mating coin blank in an adjacent array.

Receiving Cavities and Contact Datum Points

FIG. 3, FIG. 4A and FIG. 4B show front views of a receiving cavity. FIG. 3 shows a receiving cavity containing one contact datum point while FIG. 4A and FIG. 4B each contain two contact datum points.

Figure 5A:
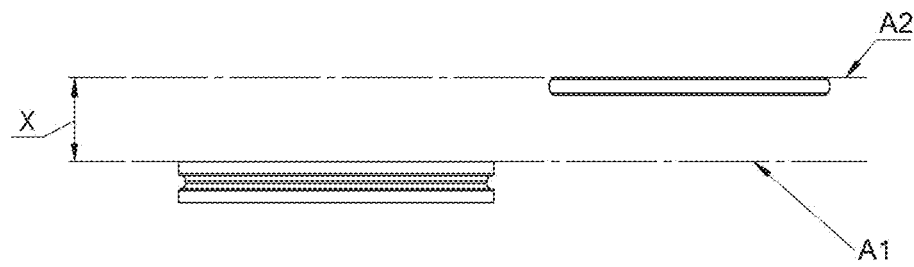
FIG. 5A-B is a schematic of offset horizontal centres and coincident vertical centres of contact datum references.

A receiving cavity may be formed from a cavity in an assembling member. In embodiments comprising a first and second assembling member having a first and second cavity, respectively. Individual components may be housed in individual cavities, or where cavities align and form a chamber, the components may be housed together in the chamber. The offset planes of the cavities may define the insertion distance X as shown in FIG. 5A.

Figure 5B:
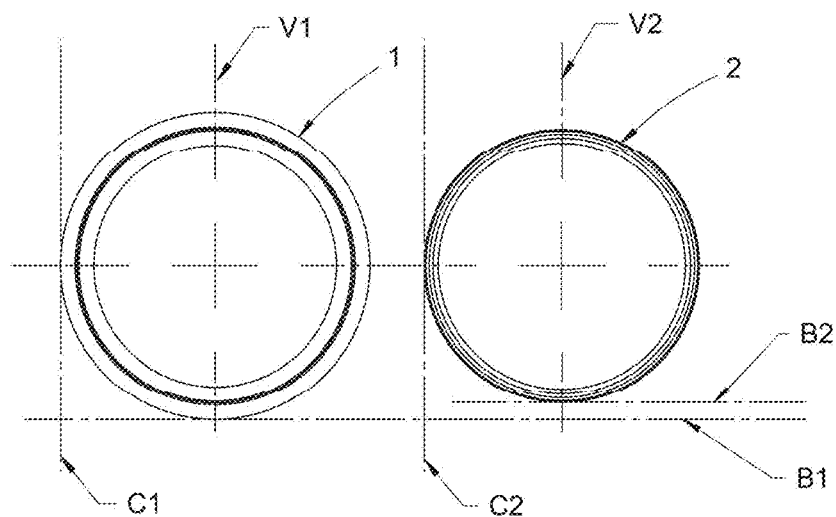

One or more contact datum points may be contained in the receiving cavity and position a coin component held therein by, for example, abutting or buttressing the coin component. FIG. 5B shows that the relative positioning of contact datum points in adjacent receiving cavities may position components housed in the adjacent receiving cavities along the desired horizontal axes and vertical axes, for example, to allow for coincident vertical centres.

Aligning the coin components in a desirable configuration prior to assembly, such as along a central axis of a receiving component, can facilitate the application of a lateral or coaxial force or merging force to assemble the coin components together.

Assembling Path

Lateral merging forces or forces, for example those coaxial with a central axis of the aligned coin components, may occur over an assembling path. The assembling path may be linear or non-linear, for example, or circular. A circular assembling path may result in a rotary coin assembly system of station.

Though components may be aligned about a central axis of a receiving coin component, certain components, for example, insertable coin components, may experience axial tilt as they travel along the assembly path. Such axial tilt may facilitate mating between complementary components as described below.

Assembly or joining over an assembling path can allow continuous and uninterrupted joining or assembly of coin components in view of the reciprocating or repetitive motion of the assembly system.

The assembling path distance may be calculated such that the path distance is greater than 0.

Merging Forces

Merging forces, such as camming forces may be applied to assemble components together along the assembling path. The application of a camming force or forces may be resultant from a structural cam or wedge feature housed within or formed by a keyway such that components moving in receiving cavities along the keyway will abut the cam and be forced into a mating component. See, for example, FIG. 6B.

Alternatively, an actuator such as a pneumatic, electronic, or mechanical actuator may apply the merging force where the merging force is a contact force. Where the merging force is a non-contact force, a magnetic actuator may be used, for example.

As such, the merging force may not require physical engagement with the components or receiving cavities, but may instead be touchless, such as but not limited to a blast of gas, or magnetic force.

Assembly Station with Cam-Based Assembling and Angled Insertion Over an Assembling Path In this embodiment, two components may be assembled at an assembly station. For illustrative purposes, the assembly of a separator 1 and insert 2 is described, though the two components may be any two of a multi-component coin blank or coin that may be assembled.

Figure 6A:
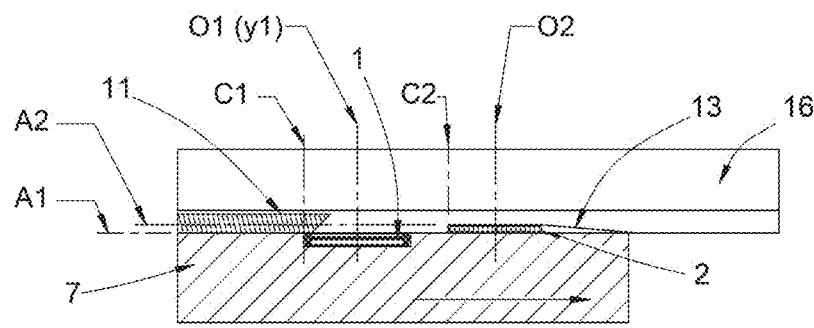
Figure 6B:
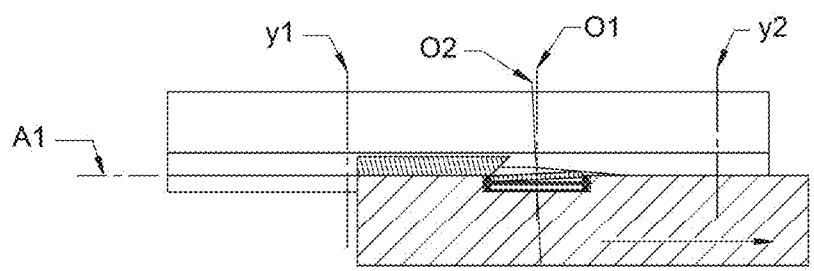
Figure 6C:
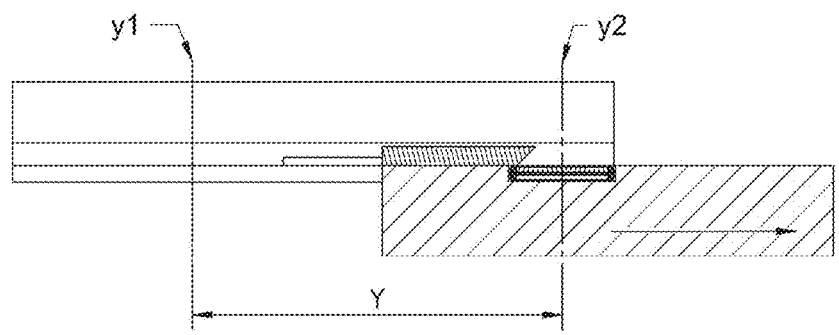

FIG. 6A-C is a plan view of a dynamic assembly with cam-based merging forces and axial tilt over an assembling. In this embodiment, two components may be assembled into a coin assembly. For example, separator 1 and insert 2 may be assembled together to form a subassembly. In this embodiment, an assembly system is shown having a first assembling member 7 and a second assembling member 16.

In FIG. 6A, the separator 1 is shown loaded into a first receiving cavity 9 defined by assembling member 7 comprising contact datum point C1. In this embodiment, the first receiving cavity 9 is open to the guide rail 8. Contact datum point B1 (not shown) is located on guide rail 8. In this embodiment, insert 2 is shown loaded into a second receiving cavity 10 defined by assembling member 16 having contact datum points B2 (not shown) and C2. Assembling member 7 may be, for example, a moveable piston. Assembling member 7 may be movable relative to assembling member 16 in an assembly reciprocation stroke.

Contact datum points B1, C1 and B2, C2 may be arranged in the respective receiving cavities 9,10 to have offset horizontal centers and have offset contact datum reference planes (A1, A2). Contact datum references B1,B2 may define the bottom contact datum points of the respective receiving cavities 9,10. These contact datum points may be defined as in, for example, FIG. 5.

In certain embodiments, components may be loaded into receiving cavities about a central axis as aligned by contact datum points B1, B2, C1, C2.

In FIG. 6B, the insert 2 may be loaded into a stationary elongated tapered receiving cavity 10 (not shown) which may have two horizontal keyways 12 that may accept two linear cams 11 on the assembling member 7. The tapered receiving cavity 10 and the keyways 12 may be contained within a back plate 16.

The assembling member 7 may move the separator and linear cams 11 towards the insert 2 until the two linear cams 11 contact the insert 2 in the stationary elongated tapered cavity 10. The linear cams 11 may become a contact point C2 for initiating merging of the insert 2 into the separator 1. As the assembling member 7 moves along the assembling path, the linear cam 11 may cause the insert 2 to experience axial tilt such that the insert's 2 trailing edge may tilt and locate into the separator 1 as shown in FIG. 6B. The insert 2 may move with the linear cam 11 on the assembling member 7 until it reaches the tapered section of the cavity 10 further called the wedge 13.

Linear cam 11 and wedge 13 may each comprise an angled guiding face.

As shown in FIG. 6C, as the assembling member 7 continues, the wedge 13 exerts a camming force on the subassembly (1+2) comprising separator 1 and insert 2. The merging force may be exerted such that it may merge the leading edge of the insert 2 into separator 1 and complete the merging of the insert 2 from A2 plane into the first separator 1 plane A1.

The heights of receiving cavity 9,10 may allow the two different diameter components to have coincident vertical centers where the centers are at the same height.

Figure 7:
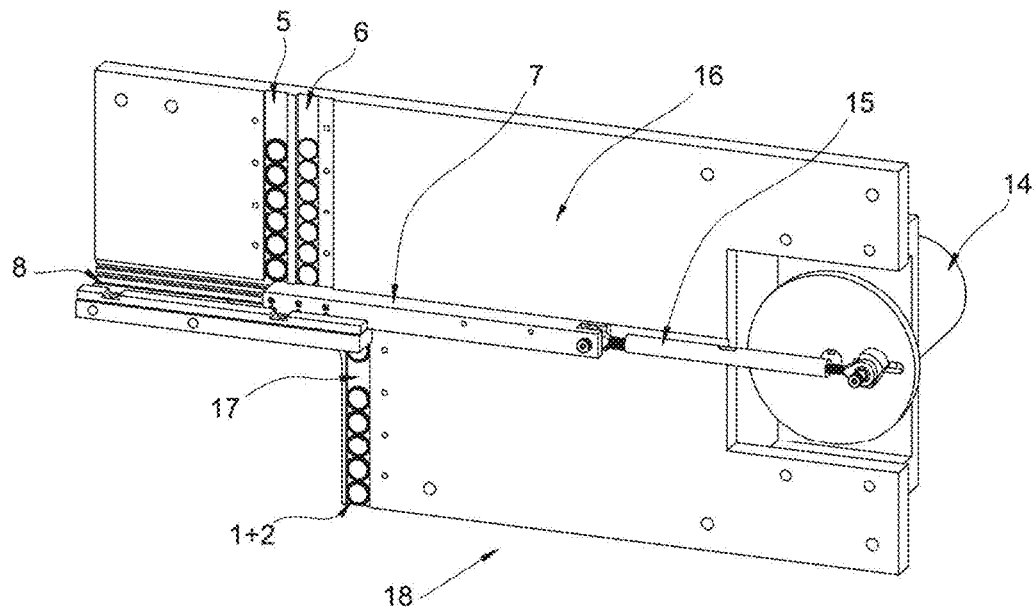
FIG. 7 is a cross-sectional perspective view of the dynamic assembly with cam-based merging forces.

For example, FIG. 7 is a cross-sectional perspective view of the dynamic assembly with cam-based merging forces. In this embodiment, separator 1 may be loaded into receiving cavity 9 (not shown) defined by movable piston 7 that may reciprocate horizontally on a guide rail 8. A motor 14 may drive a linkage 15 connected to assembling member 7. As the assembling member 7 moves through the assembly reciprocation stroke, separator 1 may be dispensed from the corresponding array from guide channel 5 by contact datum point C1 (not shown), which may be defined by a vertical face of the receiving cavity 9 (not shown). Gravity causes separator 1 to ride on the datum reference B1 (not shown) as the assembling member 7 extends during the assembly reciprocation stoke.

Inertia may cause separator 1 to seat against C1 (not shown) as the reciprocating assembly moves through the assembly stroke. Assembling member 7 may comprise two linear cams 11 that may extend into keyways 12 on planes parallel to insert 2.

Figure 8:
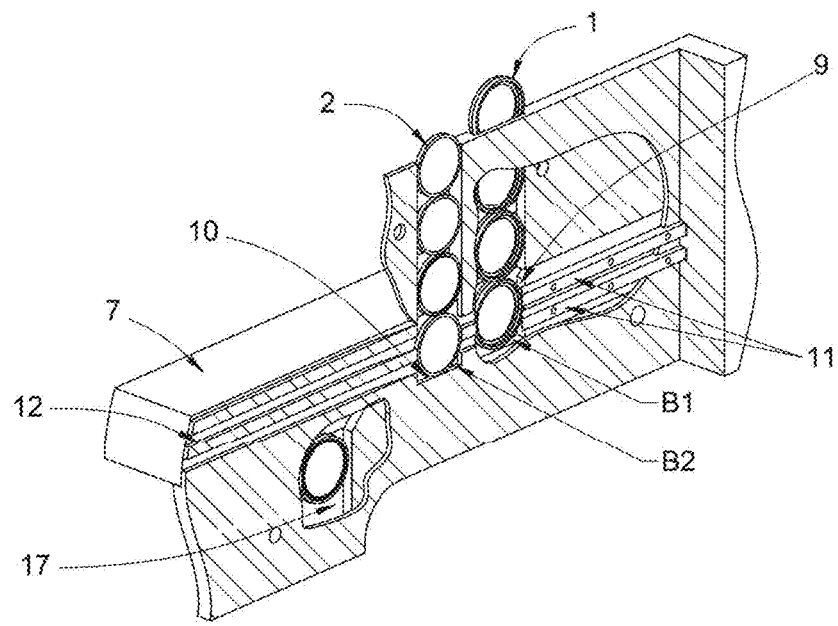
FIG. 8 is a cross-sectional perspective view of the dynamic assembly with cam-based merging forces.

FIG. 8 is a further a cross-sectional perspective view of the dynamic assembly with cam-based merging forces. The cavity 9 may be open to the guide rail 8 below such that the guide rail 8 may be discontinued at the end of the assembling member 7 assembly stroke to form an ejection slot 17. In this embodiment, when the assembling member 7 reaches the end of the assembly stroke the assembled subassembly (1+2) may be ejected from the receiving cavity 9. This ejection may be facilitated by, for example, gravity, a mechanical ejector, an air blast or a combination thereof. The subassembly (1+2) may be ejected into the ejection slot 17.

The ejection slot 17 may extend to become a guide channel for subsequent assembly stations or may become a guide channel to feed assembled blanks into a horizontal coining press 25. The reciprocating assembly reciprocates back to receive two more components to repeat the cycle.

Figure 9:
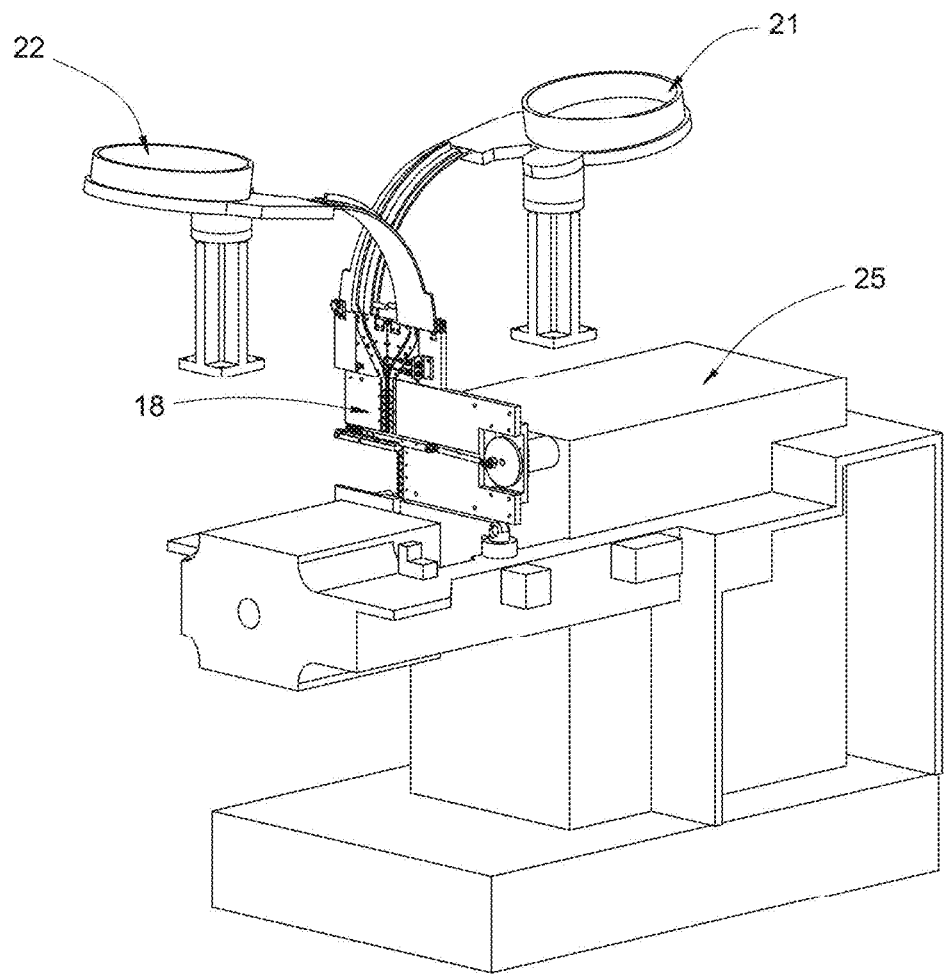
FIG. 9 is an isometric view of a two-component assembly device.

FIG. 9 is a partial cutaway perspective view of a two-component assembly device. Such an embodiment may be used to assemble bi-metal two-piece coins to feed into a horizontal coining press.

Series of Dynamic Assembly Systems/Stations with Cam-Based Cascade

In an embodiment, a plurality of dynamic assembly stations as described above may be arranged where subassemblies may cascade to one or more subsequent assembly stations for further assembly with additional components.

In this embodiment, four components may be assembled stepwise at consecutive dynamic assembly stations in series as described below. For illustrative purposes, the assembling of a separator 1, insert 2, insert 3 and outer ring 4 is described, though any number of components of a multi-component coin blank or coin may be assembled in series.

Figure 10A:
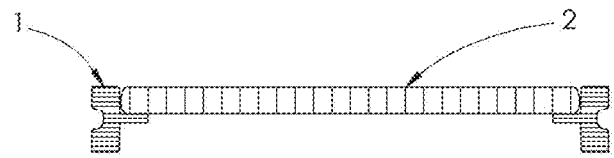
FIG. 10A-C is a schematic plan view of a cascading assembly.
Figure 10B:
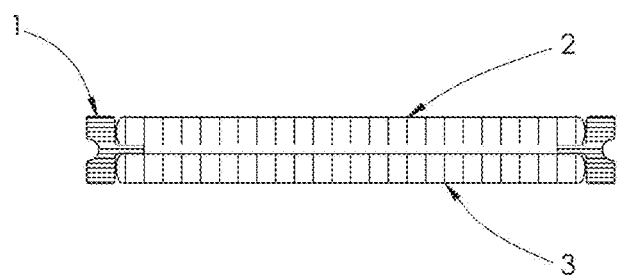
Figure 10C:
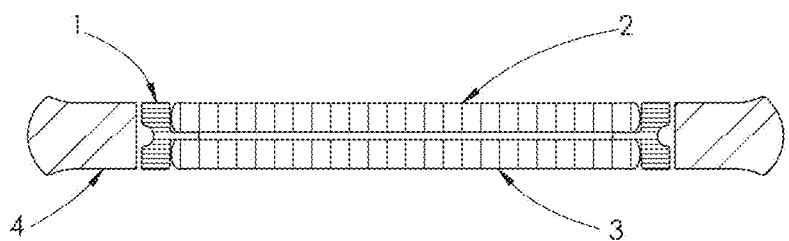

FIG. 10 is a schematic edgewise plan view of subassembly outputs of four consecutive assembly stations. In this an embodiment, a four-component coin blank or coin comprising a separator 1, two inserts 2,3, and an outer ring 4 is shown as an example.

Figure 11:
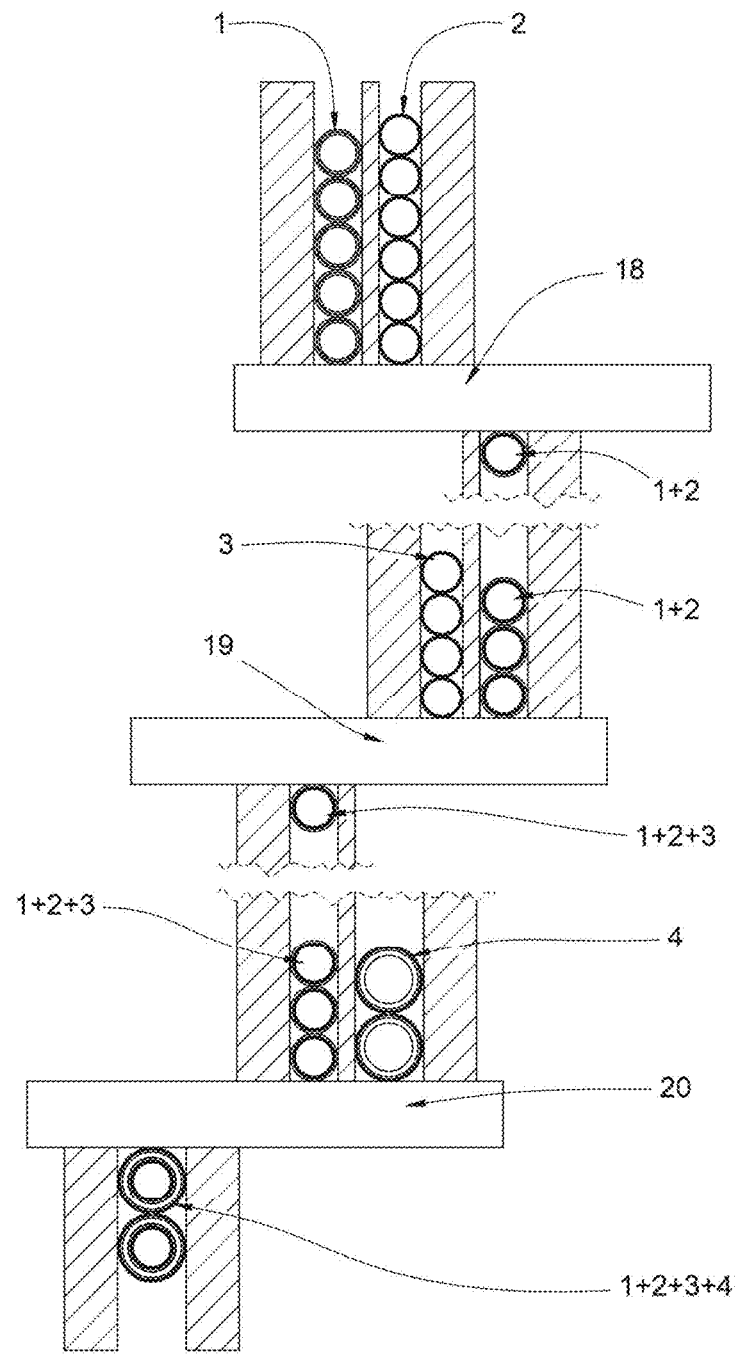
FIG. 11 is a partial cross-sectional elevation view of the cascading assembly of FIG. 10.
Figure 12:
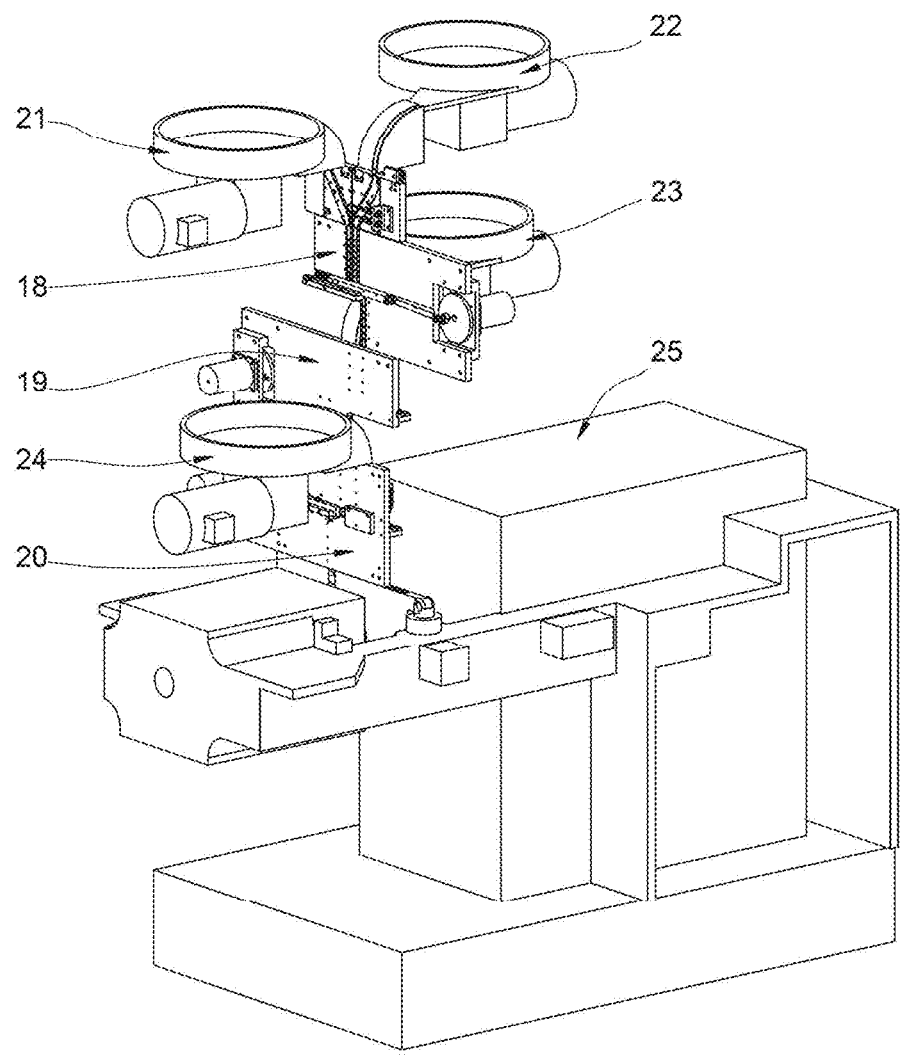
FIG. 12 is a perspective view of a four-component assembly system.

FIG. 11 is a partial cross-sectional elevation view of the cascading assembly of FIG. 10. In this embodiment, station I 18 may assemble the separator 1 and insert 2 to form subassembly 1+2, by a mechanism described in the above. Similarly, station II 19 may merge insert 3 with the subassembly 1+2 to form subassembly 1+2+3. Insert 3 may be merged with the subassembly 1+2 from the side opposite of the separator 1. Station III 20 may merge the outer ring 4 with subassembly 1+2+3 to form complete coin blank 1+2+3+4. The loosely assembled coin blank 1+2+3+4 may be fed into horizontal coining press 25 to coin the final assembly, as shown in FIG. 12. The coining operation may be a finished coin or an assembled blank with no design details.

Figure 13:
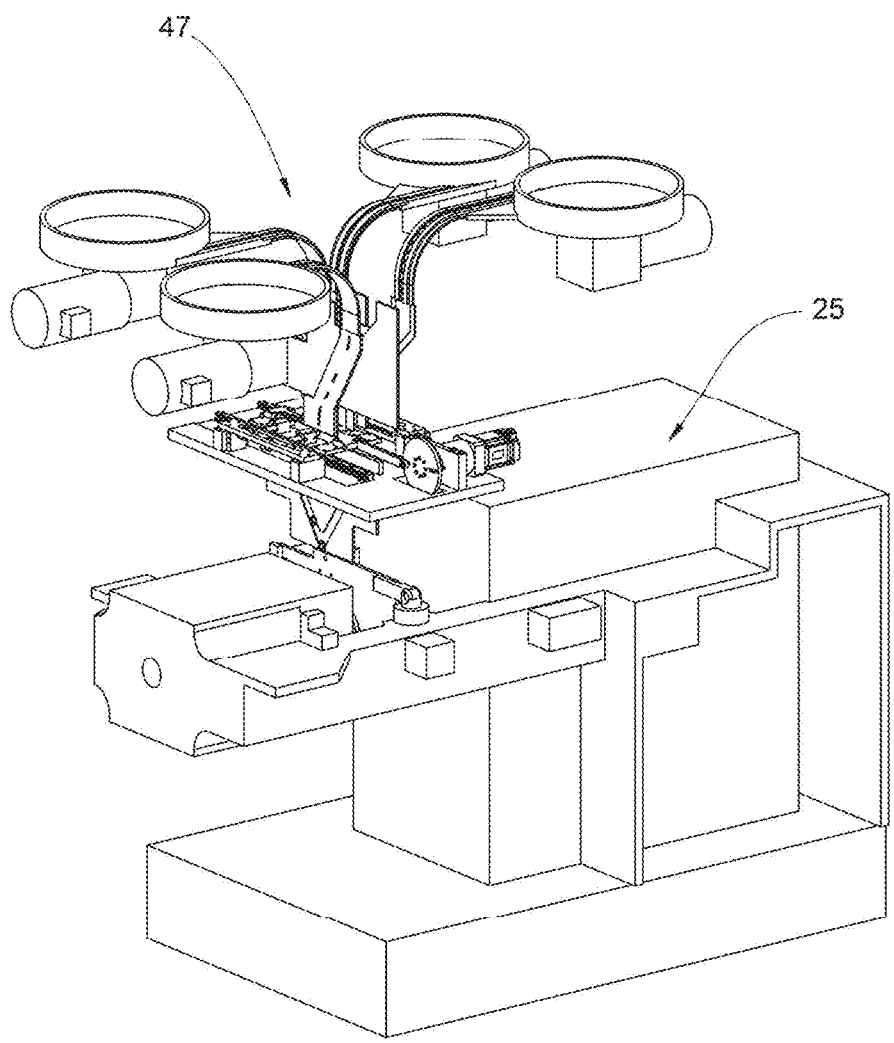
FIG. 13 is a perspective view of a coin blank assembly system.

Method of Dynamic Assembly with Cam-Based Merging Forces and Straight Insertion Over an Assembling Path FIG. 13-FIG. 19 show dynamic assembly with cam-based merging forces and straight insertion of components over an assembling path. In FIG. 13, a coin blank assembly system 47 is shown. In one embodiment, the assembly system 47 may assemble a four-component coin blank or coin over an assembling path and may feed the assembly into a coining press 25.

Figure 14:
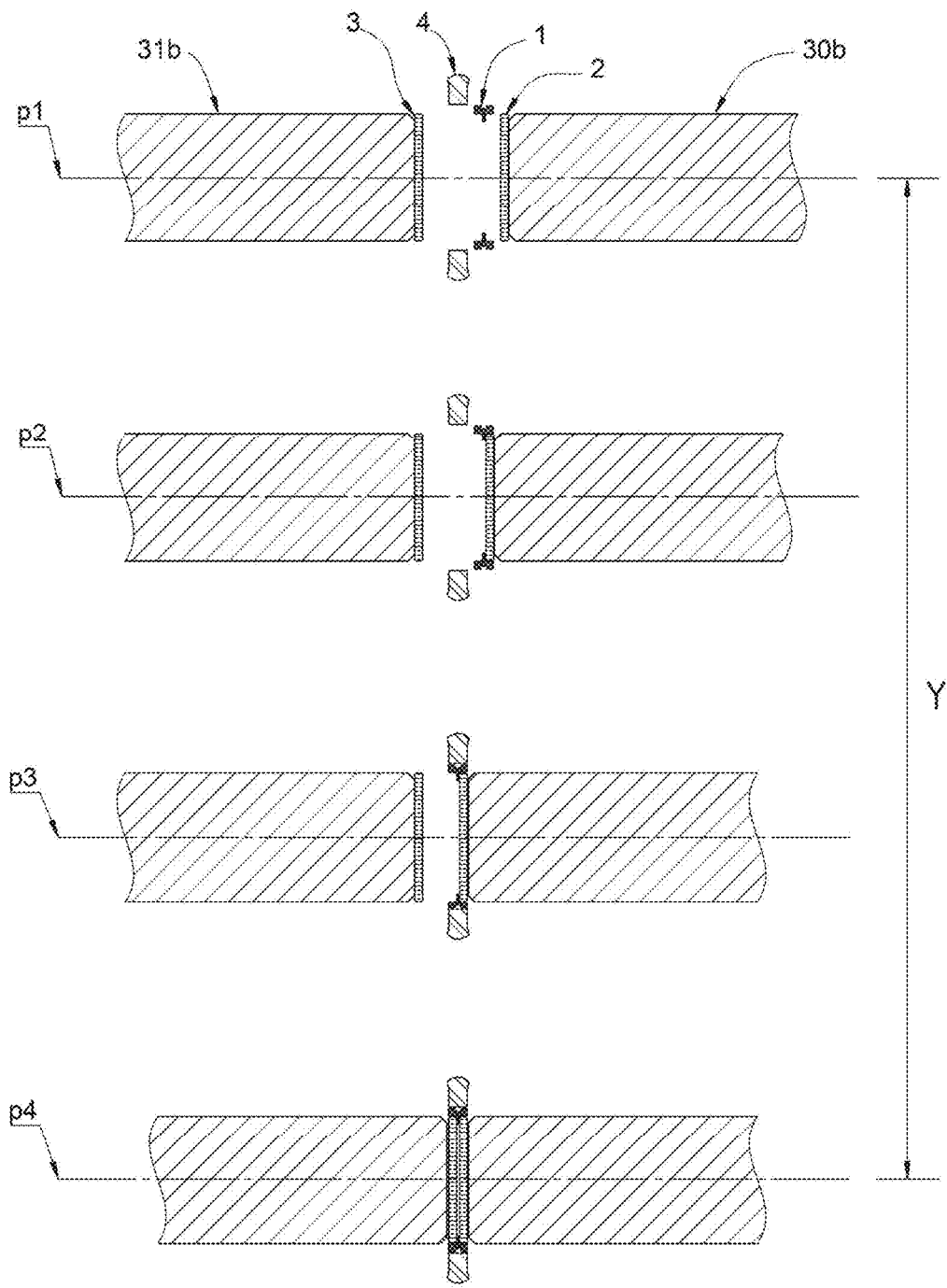
FIG. 14A-C is a schematic plan view of a dynamic assembly method with cam-based merging forces and straight insertion.

In an embodiment shown in FIG. 14, insert 2 may be merged into separator 1 to form subassembly 1+2 (FIG. 14A). Subassembly 1+2 may subsequently be merged into outer ring 4 to form subassembly 1+2+4 (FIG. 14B). Insert 3 may then be merged into subassembly 1+2+4 to form final assembly 1+2+3+4 (FIG. 14C) over non-zero distance Y along the assembly path.

Figure 15:
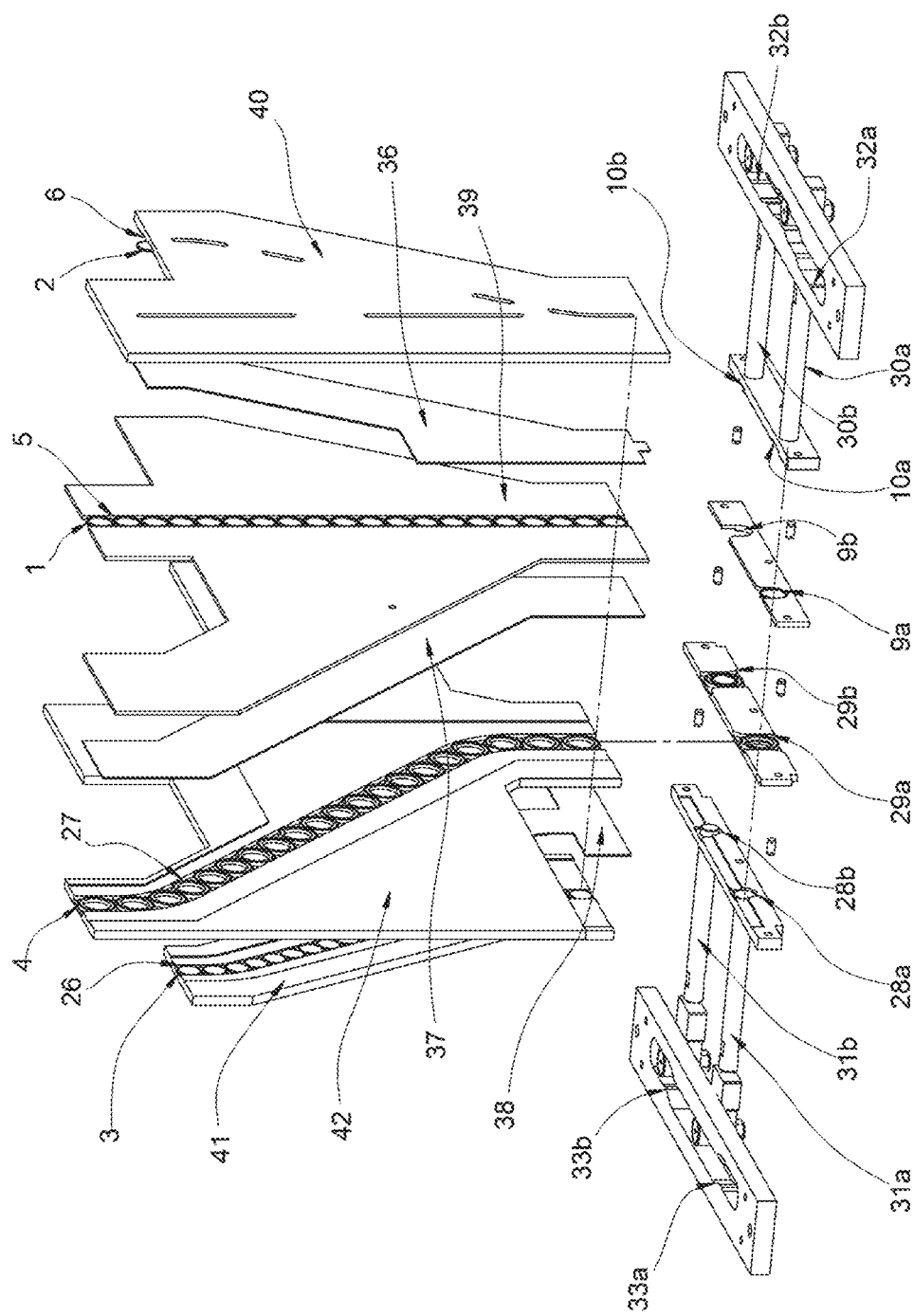
FIG. 15 is an exploded perspective view of a dynamic assembly with cam-based merging forces and straight insertion.

To achieve a multi-component assembly over an assembling path, the respective components (for example, the separator 1, insert 2, insert 3 and outer ring 4) may be aligned in coin blank arrays within guide channels 5,6,26,27 as shown in FIG. 15. The guide channels 5,6,26,27 may be contained within guide plates 39, 40, 41, 42. While verticality of the guide channels 5,6,26,27 is preferred, horizontal, angled or a combination thereof may also be acceptable.

Retainer plates 36,37,38 may be disposed between guide plates 39,40,41,42 to prevent components them from prematurely merging into a mating coin blank.

Guide channels 5,6,26,27 may terminate in permanently aligned receiving cavities 9,10,28,29 containing contact datum points to align coin components deposited therein about coincident centers along a central axis. The receiving cavities 9,10,28,29 may be contained within a receiving cavity assembly 45 for horizontally reciprocating along guide rail 35.

The receiving cavity 29 of the largest component, for example the outer ring 4, may be an open cavity for allowing the component to ride on datum rail 43. Smaller components, for example separator 1, and inserts 2,3, may be deposited from their respective guide channels into closed bottom cavities 5,6,28 containing contact datum points that may precisely locate the blanks concentrically along a common axis. At the end of a stroke, the datum rail 43 may be discontinued at a discharge point 44.

Figure 16:
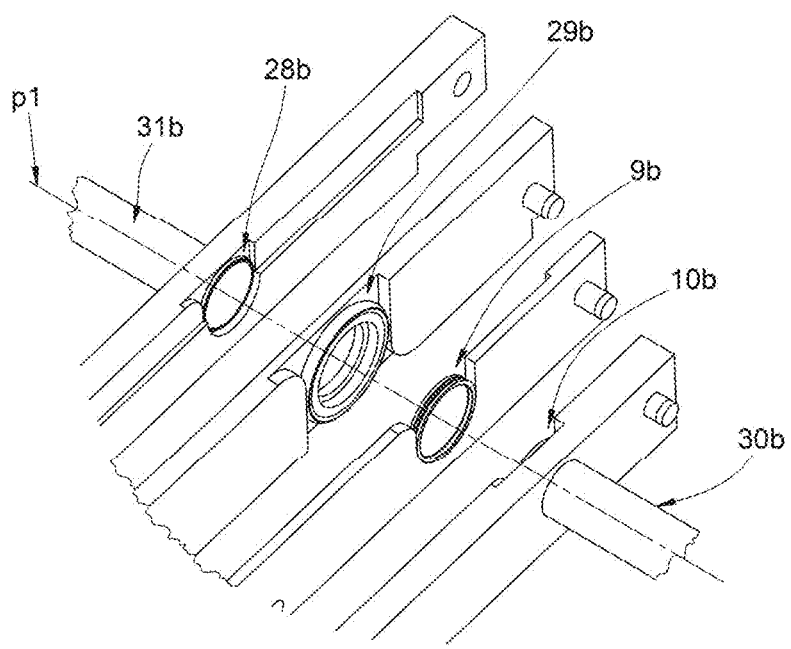
FIG. 16 is an exploded detail view of the dynamic assembly with cam-based merging forces and straight insertion of FIG. 13.
Figure 17:
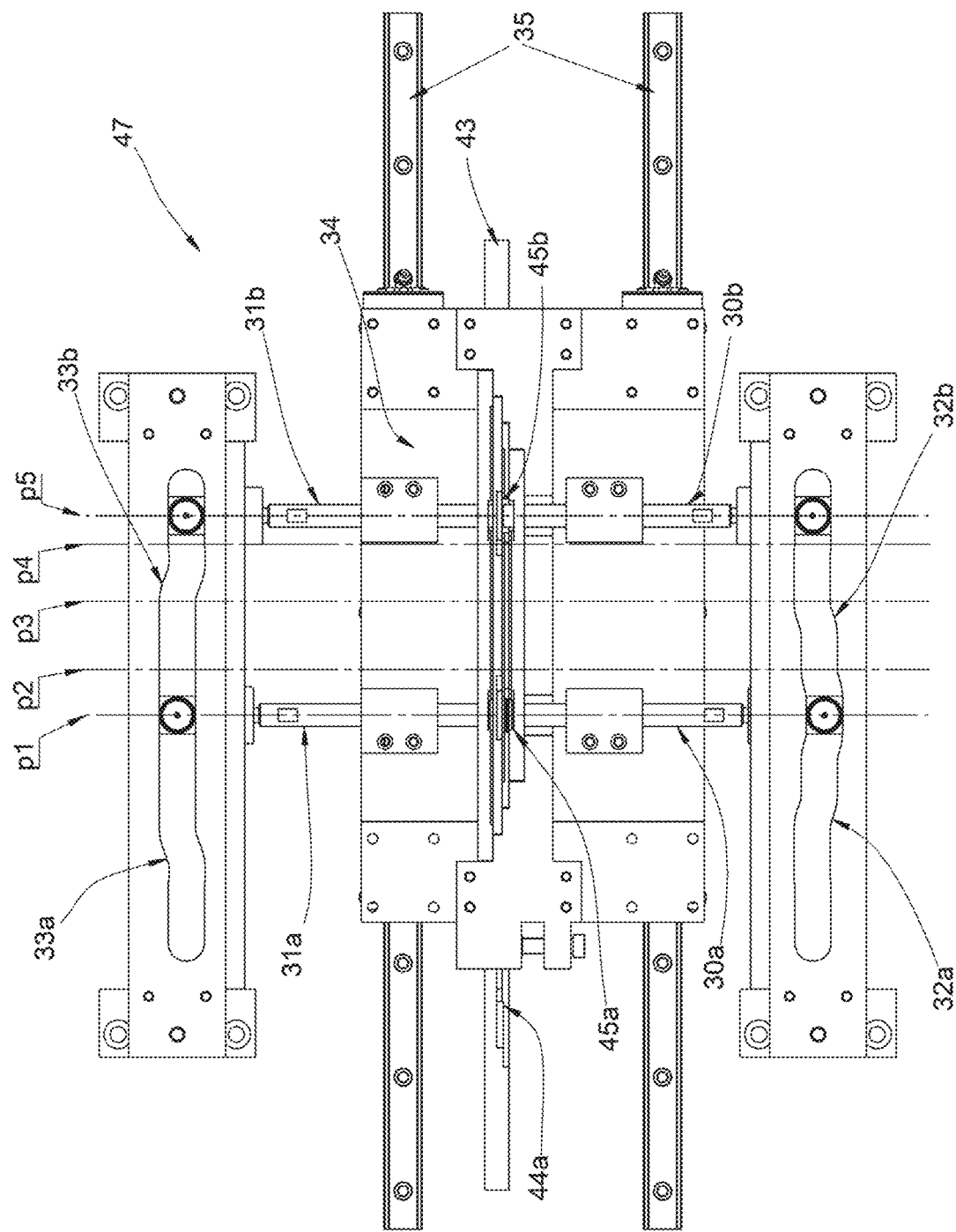
FIG. 17 is a detail plan view of a coin blank assembly system.

As seen in FIG. 16, receiving cavities 9b,10b,28b,29b may carry a set of components from the respective arrays. In FIG. 17, a set of linear cams 32b,33b and cam followers 30b,31b may exert a merging force or two opposing merging forces about the components to merge the components together into the plane of the largest component, for example, outer ring 4.

At the end of the reciprocation stroke, linear cams 32b, 33b and cam followers 30b,31b may cease exerting the camming force(s) to allow the 1+2+3+4 assembly to drop out of a slot at the end of the stroke at discharge point 44.

Figure 18:
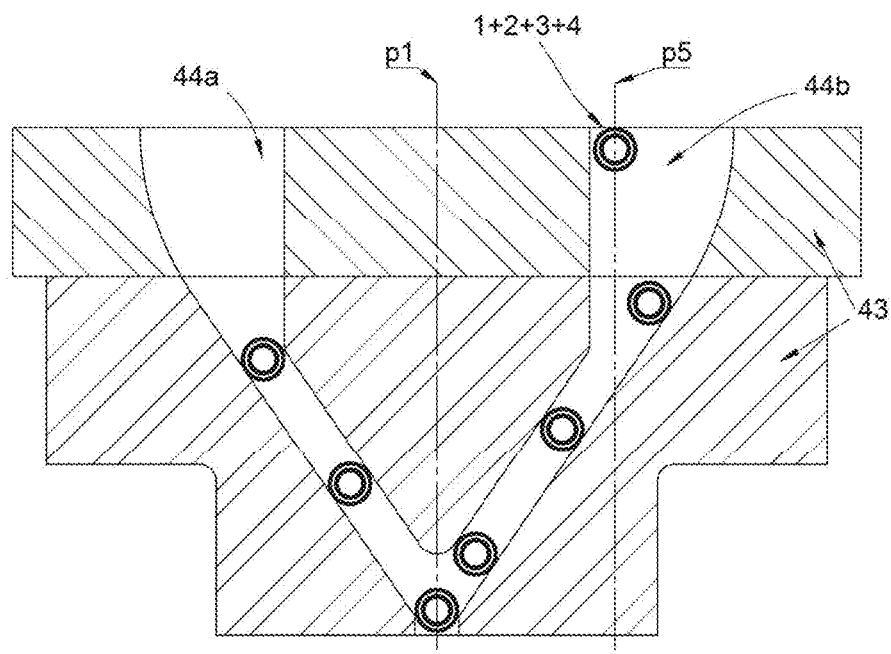
FIG. 18 is a cross-sectional elevation view of a coin blank discharge guide.
Figure 19:
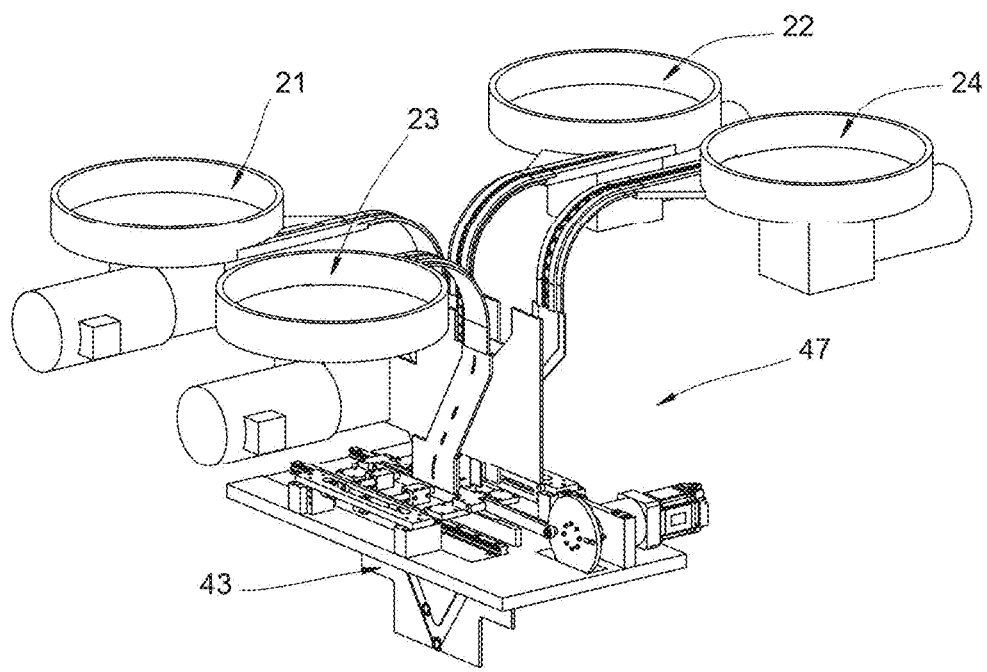
FIG. 19 is a perspective view of the coin blank assembly system.

A second set of cavities 9a,10a,28a,29a in the receiving cavity assembly 45 may repeat the assembly operation on the return stroke. Discharge points 44a, 44b may then feed respective guide channels that guide the final assembly into, for example, subsequent stations of coin press (FIG. 18-FIG. 19).

Figure 20:
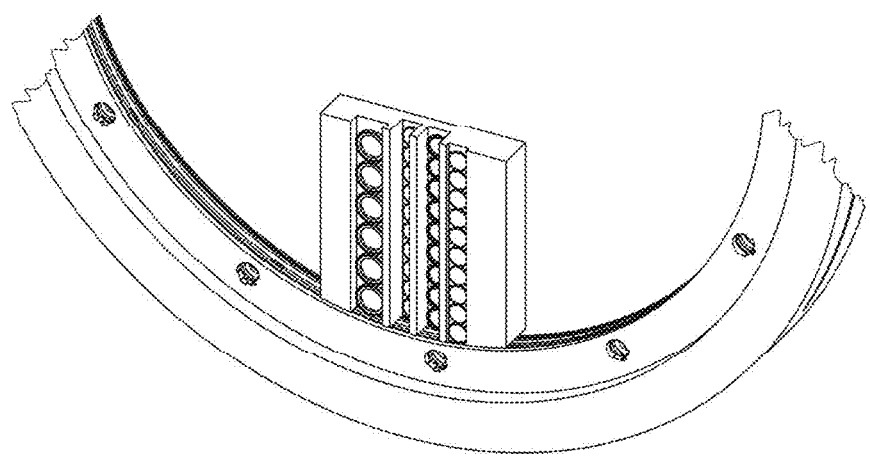
FIG. 20 is a partial perspective view of a coin blank assembly device with a circular assembling path.
Figure 21:
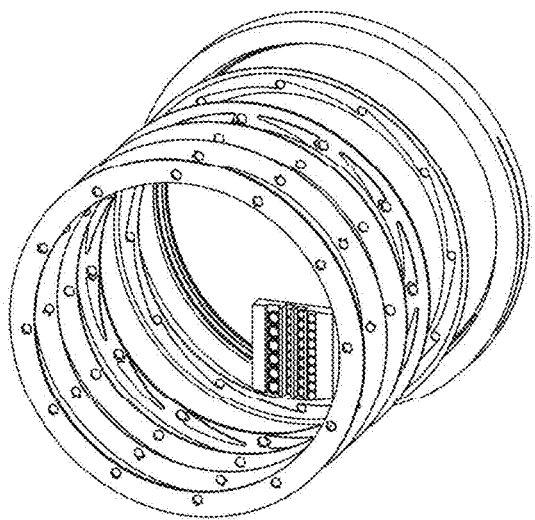
FIG. 21 is an exploded perspective view of a coin blank assembly device with a circular assembling path.

In the embodiment shown in FIGS. 20-21, the reciprocation stroke may be non-linear. For example, a stroke may follow a circular assembling path to further reduce the footprint of the assembly, improved throughput for the same speed of operation and a longer assembling path.

In the preceding description, for purposes of explanation, numerous details are set forth in order to provide a thorough understanding of the embodiments. However, it will be apparent to one skilled in the art that these specific details are not required.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

In addition, the steps and the ordering of the steps of methods described herein are not meant to be limiting. Methods comprising different steps, different number of steps, and/or different ordering of steps are also contemplated.

The above-described embodiments are intended to be examples only. Alterations, modifications and variations can be effected to the particular embodiments by those of skill in the art without departing from the scope, which is defined solely by the claims appended hereto.

What is claimed is:

1. A method of assembling coin components, the method comprising:
   a. providing the coin components in an assembly station, the assembly station being moveable along a non-zero distance; and
   b. continuously assembling the coin components over the non-zero distance along an assembling path by exerting two opposing forces generally coaxially with a central axis which is perpendicular to a face of one of the coin components, the two opposing forces exerted by at least one stationary cam, wherein the assembled coin components are fed into a second assembling station for assembly with at least one additional coin component.

2. The method as in claim 1, wherein the assembling path is non-colinear with a central axis of at least one of the coin components.

3. The method as in claim 1, wherein the coin components are assembled over the non-zero distance by at least one merging force, the at least one merging force being exerted from about 0° to about 89.99° relative to the central axis.

4. The method as in claim 1, wherein at least one of the coin components experiences axial tilt along the non-zero distance.

5. The method as in claim 1, wherein the non-zero distance is linear, non-linear, or circular.

6. The method as in claim 1, wherein the assembled coin components are discharged at a terminus of the assembling path.

* * * * *